United States Patent [19]
Krawczyk et al.

[11] Patent Number: 6,039,488
[45] Date of Patent: Mar. 21, 2000

[54] BREAKABLE AMPULE, SWAB AND CAP FOR SCENT MATERIAL

[75] Inventors: Dwayne M. Krawczyk, LaPlace; Mabry M. McFarlin, Swartz, both of La.

[73] Assignee: Louisiana Bucks Unlimited, L.L.C., Monroe, La.

[21] Appl. No.: 09/104,202

[22] Filed: Jun. 25, 1998

[51] Int. Cl.[7] ................................................. B43K 5/14
[52] U.S. Cl. ............................... 401/132; 401/199; 43/1
[58] Field of Search ............................. 401/132, 199, 401/196, 198; 43/1

[56] References Cited

U.S. PATENT DOCUMENTS

| | | | |
|---|---|---|---|
| 3,152,352 | 10/1964 | Kosik, Jr. | 401/132 |
| 3,614,245 | 10/1971 | Schwartzman | 401/132 |
| 3,777,949 | 12/1973 | Chiquiari-Arias | 401/132 |
| 3,792,699 | 2/1974 | Tobin et al. | 128/2 W |
| 4,211,323 | 7/1980 | Olsen | 206/210 |
| 4,609,245 | 9/1986 | Sakschek | 401/199 X |
| 4,747,719 | 5/1988 | Parkin | 401/132 |
| 4,784,506 | 11/1988 | Koreska et al. | 401/132 |
| 5,098,297 | 3/1992 | Chari et al. | 401/132 X |
| 5,288,159 | 2/1994 | Wirt | 401/133 |
| 5,327,667 | 7/1994 | Fore | 43/1 |
| 5,746,019 | 5/1998 | Fisher | 43/1 |

FOREIGN PATENT DOCUMENTS

| | | | |
|---|---|---|---|
| 3508388 | 9/1985 | Germany | 401/132 |

*Primary Examiner*—David J. Walczak
*Attorney, Agent, or Firm*—Jacobson, Price, Holman & Stern, PLLC

[57] ABSTRACT

A dispenser and applicator for animal scent material and a method of dispensing animal scent directly into the air and/or applying animal scent to surfaces includes a generally cylindrical shape-sustaining flexible casing, a generally cylindrical breakable ampule having a quantity of liquid scent material therein. A porous plug applicator swab closes an open end of the casing and a dispensing cap is mounted on the casing in enclosing relation to the open end of the casing and the projecting end of the porous plug. The liquid scent material is applied by placing the dispensing cap on the closed end of the casing and breaking the ampule by squeezing opposite sides of the cap and casing to deform the casing wall inwardly to break the ampule. The scent material is absorbed by the porous plug applicator swab and the swab can apply the liquid scent material to surface areas. The liquid scent material can also be dispensed directly into the air by retaining the dispensing cap on the open end of the casing and breaking the ampule for absorption by the dispensing cap from the porous plug applicator swab. The scent material can be the urine of the male or female of an animal species which attracts a male and/or female of the animal species and covers or masks human scent to enable a hunter to more effectively attract hunted animals to a hunting site.

8 Claims, 2 Drawing Sheets

BREAKABLE AMPULE, SWAB AND CAP FOR SCENT MATERIAL

BACKGROUND OF THE INVENTION

1. Field of the Invention

The present invention generally relates to a dispenser and applicator for a liquid animal scent material used in hunting and the like and to a method of dispensing the scent material directly into the air and/or onto desired surfaces. More specifically, the present invention relates to a small shape-sustaining flexible casing enclosing a breakable ampule having a quantity of the liquid scent material contained therein, which when broken allows the liquid scent material to escape from the casing for dispersion in the air or application to any desired surface.

2. Description of the Prior Art

When hunting animals, a hunter usually enters an area frequented by the species being hunted and in some instances climbs to an elevated position and occupies a stand or occupies a blind for concealing his presence. In order to render hunting procedures more effective and thus more enjoyable, various types of baits and other procedures have been used to entice various wild animals to specific areas when hunting, trapping or fishing. In some instances, a bait which emits a scent or odor has been used for enticing wild animals to a particular area to facilitate the hunting, trapping or fishing procedure. The scent of the urine of the male or female of a particular species of wild animal is frequently used to attract the male and/or female of the species of wild animal to a particular location by applying liquid urine to various surface areas in the location of the hunter. This enables the hunter to more effectively utilize a projectile such as a bullet, shotgun load or arrow to obtain an animal kill with less likelihood that the animal would only be wounded, which could result in the animal still being capable of moving rapidly away from the location of the hunter. Also, the scent of the urine serves to cover or mask the human scent of the hunter in the vicinity.

One example of this baiting procedure is to pour doe urine from a container onto the ground surface in an area adjacent a hunter which may be positioned in a deer stand attached in elevated position to a tree. However, the storage, transport and application of doe urine from a container onto the ground surface or other surface areas is difficult and in some instances can result in contamination of the person dispensing or pouring the doe urine from a container onto surface areas in order to entice a male or buck deer to the area as well as to cover or mask the human scent of the hunter.

The following U.S. patents disclose various devices in which liquid material is sealed into an ampule, capsule or vial which can be opened, punctured or ruptured in order to dispense the liquid material.

| | | |
|---|---|---|
| 3,614,245 | 4,747,719 | 5,327,667 |
| 3,792,699 | 4,784,506 | 5,746,019 |
| 4,211,323 | 5,288,159 | |

U.S. Pat. No. 5,327,667 to Fore discloses a scent dispensing device which is adhesively secured to the shoe of a hunter and is capable of emitting an odor to attract deer to the hunter. A frangible container which encloses a scented liquid is disposed between opposing upper and lower plastic strips which are perforated and the lower strip has adhesive for attachment to the shoe of the hunter. A thin layer of absorbent material is disposed between the frangible container and the perforated strips. The hunter must break the container so that liquid from the container can seep into the absorbent layer for evaporation.

U.S. Pat. No. 3,614,245 to Schwartzman discloses a felt tip pen or pad having an internally disposed reservoir for containing a volume of liquid therein. A porous pad extends from the reservoir to an externally disposed tip for applying liquid material to a surface when the reservoir is ruptured or broken.

U.S. Pat. No. 5,746,019 to Fisher discloses another liquid material dispenser including a frangible vial within a flexible sheath and a wick adjacent the vial. Liquid scent material in the vial is discharged onto the wick when the vial is broken. The wick has an exposed area to enable evaporation of the scented liquid into the atmosphere to attract animals.

The above prior patents and known devices and procedures do not incorporate the use of a sealed but breakable ampule containing liquid scent material such as doe urine enclosed within a shape-sustaining flexible casing having a porous, absorbent, plug applicator swab mounted in one end. Nor do the prior art devices include such a structure together with an exposed dispensing cap mounted on the end of the casing having the porous plug applicator swab. The Esurine is applied to various surfaces in the location of the hunter by holding the casing and utilizing the absorbent swab to safely and quickly apply the doe urine to surface areas in amounts sufficient to attract a buck deer to the area and covering or masking human scent of the hunter. The casing is used as a handle to reduce any possibility of the hunter coming into contact with the doe urine during storage, transport or application to the surface areas. The dispensing cap can be mounted on the closed end of the casing and extend along the length of the casing to protect the fingers from any glass that may penetrate the casing when breaking the ampule. Alternatively, the dispensing cap can remain over the end of the swab to absorb scent material from the swab in order to dispense scent directly into the air.

SUMMARY OF THE INVENTION

The present invention involves a simple self-contained liquid bait delivery system which includes a shape-sustaining but flexible and waterproof casing having an opening formed therein. The casing encloses a breakable ampule containing liquid scent material, such as male or female animal scent. A porous plug applicator swab is positioned in the opening in the casing. A dispensing cap then externally closes the opening in the casing and the swab. By squeezing the flexible casing the ampule is broken and the liquid scent material is discharged onto the swab for dispensing directly into the air, or for applying liquid scent material, such as liquid wild animal bait or lure, to surface areas located where wild animals may likely pass or in locations to which wild animals would likely be attracted or enticed by the bait or lure.

Preferably, the casing is a relatively small elongated tubular member closed at one end and open at the other end to form the opening of the casing. In the preferred embodiment, the casing is generally cylindrical. The breakable ampule is also preferably cylindrical in shape and sized to fit easily in the casing. The porous plug applicator swab is placed in the open end of the casing and preferably extends a slight distance beyond the casing opening in order to serve as a swab to dispense the liquid scent to the desired surface areas. The dispensing cap is initially mounted on the open end of the casing and encloses the end of the porous plug applicator swab. The dispensing cap can then dispense liquid scent material directly into the air when breaking the ampule discharges the scent material into the casing and through the porous plug applicator onto the interior of the dispensing cap. Alternatively, the dispensing cap can be removed from around the swab and mounted on the closed end of the casing. It then extends along the length of the casing and serves as a holder when dispensing the liquid directly to the desired surfaces by the swab. As such, the dispensing cap can protect the fingers from any glass that may penetrate the casing when breaking the ampule and dispensing the liquid scent material through the swab.

Preferably, the porous plug applicator swab is made of cotton or plastic fibers or similar material which will readily transmit the liquid scent material therethrough, and act as a swab for applying the liquid scent material directly to the desired surfaces. The dispensing cap is preferably made of paper, thin cardboard or other lightweight porous material which can act both to dispense the liquid scent material therethrough to the surrounding air or as a holder for the casing and swab when applying the liquid scent material directly to the desired surfaces with the swab.

The ampule, casing, swab and cap enable the scent material to be packaged, stored, transported and used with the scent bait completely sealed in the ampule until it is ready for use at which time the ampule can be broken and the scent bait discharged onto the swab. This enables release of the scent directly into the air or application of the liquid scent bait or lure to various surfaces including tree branches, tree trunks in which a deer stand may be placed or on other surface areas in which a hunter may be located and even on the hunter to enable the hunter to effectively obtain a "shot" at the wild animal that has been enticed toward the scent bait.

Accordingly, it is an object of the present invention to provide a one-time use liquid scent material dispenser and applicator in the form of a shape-sustaining deformable casing having a porous plug applicator swab and an exposed dispensing cap at an open end thereof and enclosing a sealed breakable ampule containing a quantity of liquid scent material. With the dispensing cap placed on the closed end of the casing, the porous plug applicator swab can be used to apply the scent material to various surface areas after the casing has been deformed to break the ampule for discharging the scent material onto the swab with the casing and dispensing cap forming a holder or handle for manipulating the swab. With the dispensing cap retained on the open end of the casing, the dispensing cap can act as a wick to dispense the scent directly into the air once the ampule is broken and the liquid scent material flows through the swab.

Another object of the present invention is to provide a breakable ampule enclosed within a flexible casing with a swab attached to one end of the casing for applying liquid bait, such as urine and the like, to various surface areas adjacent the location of a hunter with the liquid urine being that of the male or female of a species of wild animal thereby attracting the male and/or female of the animal species.

A further object of the present invention is to provide a casing, breakable ampule, swab and cap in accordance with the preceding objects in which the casing is generally of cylindrical configuration with one closed end and a porous plug applicator swab in an opposite open end. The casing is constructed preferably of flexible but shape sustaining transparent plastic or other material which will protect the ampule during handling, storage and transport, but sufficiently flexible to enable the casing to be deformed by squeezing opposite sides of the casing. The ampule is preferably constructed of glass or other frangible material and contains a quantity of liquid scent material therein. The ampule is broken by squeezing opposite side areas of the casing inwardly which permits the liquid material to be discharged into the casing and onto the porous plug applicator swab and through the porous swab onto the dispensing cap. The dispensing cap is generally a cylindrical absorbent material mounted removably and circumferentially around the open end of the casing and a projecting end of the swab and extends slightly beyond the end of the casing and swab to absorb the scent material and slowly release it directly into the air.

Still another object of the present invention is to provide a casing, breakable ampule, swab and cap in accordance with the preceding object in which the dispensing cap is removed from around the open end of the casing and projecting end of the swab and mounted onto the closed end of the casing to serve as a holder when squeezing the opposite sides of the casing to break the frangible ampule and apply the liquid scent material with the porous plug applicator swab when the liquid scent material flows from the broken ampule.

These together with other objects and advantages which will become subsequently apparent reside in the details of construction and operation as more fully hereinafter described and claimed, reference being had to the accompanying drawings forming apart hereof, wherein like numerals refer to like parts throughout.

DESCRIPTION OF THE PREFERRED EMBODIMENT

Figure 1:
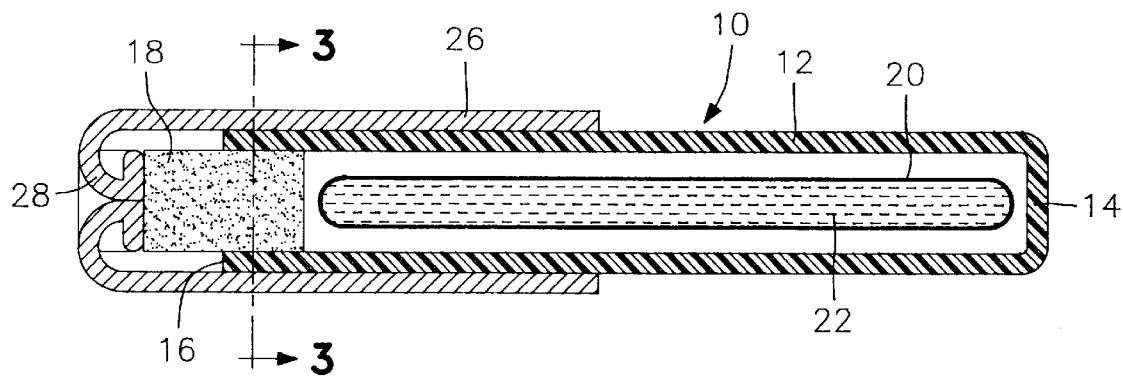
FIG. 1 is a longitudinal, sectional view of the casing, breakable ampule, swab and dispensing cap constructed in accordance with a preferred embodiment of the present invention.

Although only one preferred embodiment of the invention is explained in detail, it is to be understood that the invention is not limited in its scope to the details of construction and arrangement of components set forth in the following description or illustrated in the drawings. The invention is capable of other embodiments and of being practiced or carried out in various ways. Also, in describing the preferred embodiment, specific terminology will be resorted to for the sake of clarity. It is to be understood that each specific term includes all technical equivalents which operate in a similar manner to accomplish a similar purpose.

Figure 2:
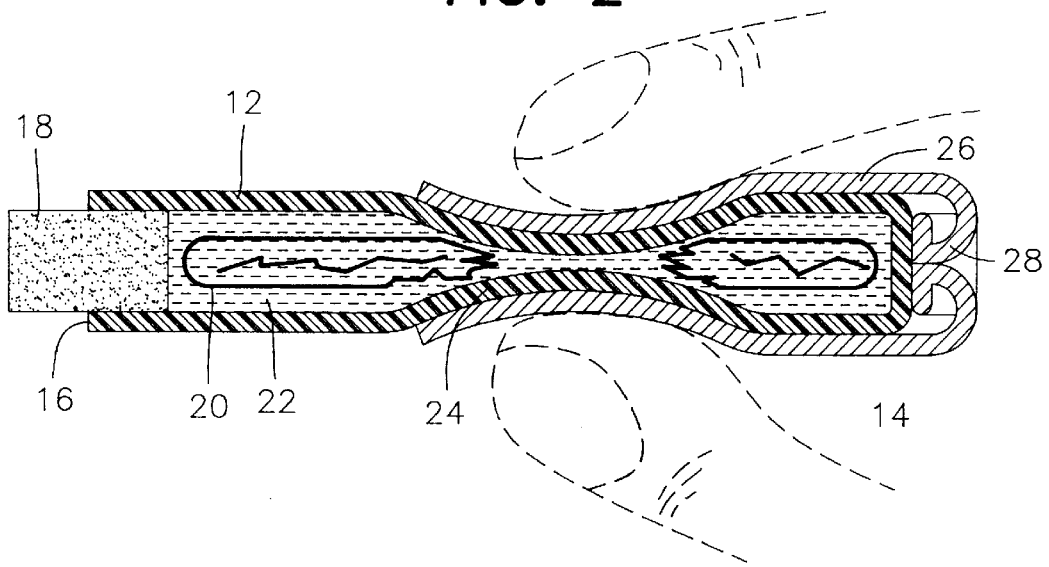
FIG. 2 is a longitudinal, sectional view of the casing, breakable ampule, swab and dispensing cap of FIG. 1, illustrating the structural relationship thereof when the ampule is being broken.
Figure 3:
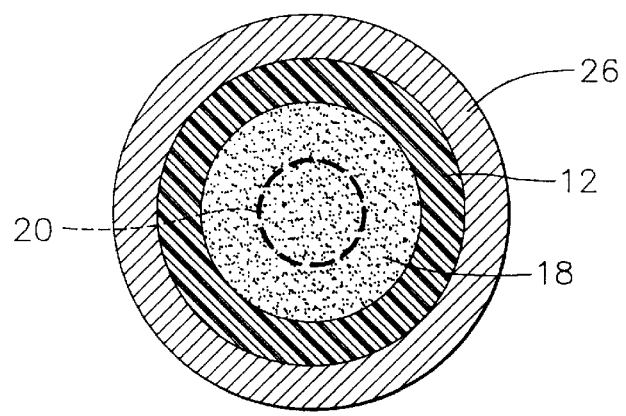
FIG. 3 is a transverse sectional view of the casing, porous plug applicator swab and dispensing cap taken along section line 3—3 on FIG. 1.
Figure 4:
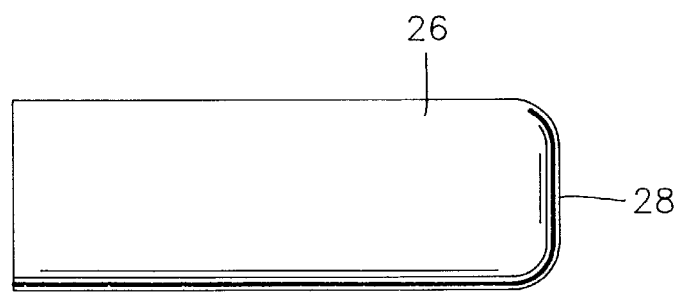
FIG. 4 is a side elevational view of the dispensing cap.
Figure 5:
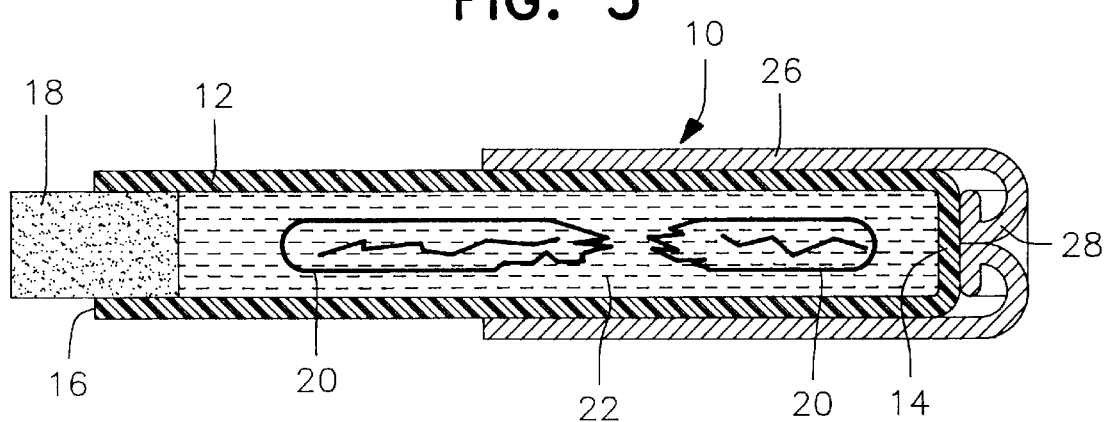
FIG. 5 is a sectional view similar to FIG. 2 and illustrating the dispensing cap on the closed end of the casing to serve as a holder or handle on the casing when applying the swab to surface areas.

Referring now specifically to the drawings, the casing, breakable ampule, porous plug applicator swab and dispensing cap of the present invention are generally designated by reference numeral 10 and include a generally elongate, cylindrical casing 12 preferably constructed of a shape-sustaining, waterproof but flexible material. The casing 12 has a closed end 14 and an open end 16. Inserted into the open end 16 is a porous plug applicator swab 18, which is porous, absorbent, forms a plug for the casing and an applicator. The swab 18; extends slightly outward beyond the edge of the open end 16 of casing 12. The casing 12 encloses a breakable ampule 20 preferably constructed of glass which contains a quantity of liquid scent material 22 such as doe urine or the like. The inside diameter of the casing 12 is slightly larger than the outer diameter of ampule 20 so that the casing 12 encloses the ampule 20 in slightly spaced relation thereto. The casing 12 is constructed of waterproof material, preferably transparent plastic material, having shape sustaining characteristics to protect the ampule 20 from breakage during normal forces encountered when transporting, storing and handling. However, opposed surfaces of the central area of the casing 12 can be deformed inwardly sufficiently to break the ampule 20 by squeezing inwardly on opposed surfaces of the casing by using the thumb and forefinger, as shown in FIG. 2 at 24. The elongated wall of the ampule 20 is sized to withstand minor shocks but break upon pressure from thumb and forefinger.

A dispensing cap 26 encloses the open end 16 of the casing 12 which has the porous plug applicator swab 18 therein. The cap 26 is removably and frictionally mounted externally on end 16 of casing 12 and extends slightly beyond the end 16. The outer end of the dispensing cap 26 is turned inwardly at 28 and covers the end of the porous plug applicator swab 18. The cap 26 is designed when retained on open end 16 to absorb liquid scent material passing through the porous plug applicator swab 18. The dispensing cap 26 can then serve as a wick to dispense the liquid scent bait to the ambient air. The dispensing cap 26 may be formed by glueing a plurality of layers of paper or absorbent plastic or the like material and positioning it in encircling relation to the end 16 of the casing 12. The porous plug applicator swab 18 may be constructed of heavy duty, flexible paper or other absorbent material and extends slightly beyond the open end 16 of casing 12 to enable the liquid scent material 22 that was sealed in the ampule 20 to first discharge from the ampule 20 into cylindrical casing 12 when the ampule 20 is broken and then pass into and through the porous plug applicator swab 18 into the dispensing cap 26.

The size and shape of the ampule 20 can vary depending upon the volume of liquid scent material 22 desired to be discharged into the porous plug applicator swab 18. Likewise, the length, material and absorbency of the porous plug applicator swab 18 may vary. The porous plug applicator swab 18 may be in the form of a continuous porous member to enable easy application of the liquid scent bait or lure to various surfaces by moving the swab 18 in a manner to brush the swab against the surfaces or the swab 18 may merely contact the surfaces. The casing 12 or the dispensing cap 26 when placed on the closed end 14 of casing 12 forms a holder or handle to enable easier application of the liquid scent material 22 to various surfaces and prevents the fingers of the hunter from contacting the liquid scent material.

In one form, the cylindrical casing 12 has a diameter of about ⅜ inch and a length of about 2 inches forming an overall length of about 2 ¼ inches including the swab 18. Smaller sizes are possible and larger sizes, such as diameters of ½ and ⅝ inches, can be used if larger volume liquid scent material per dose or package is desired. Generally speaking, the length of the casing is preferably between about 6 and about 10 times the diameter.

The liquid scent material serves as a bait or lure and may be the urine of a wild animal species and specifically the male or female of the animal species in order to lure or attract the male and/or female of the animal species to the area which has been treated with the liquid scent material. One preferred type of liquid scent material is the urine of a doe in order to attract a buck or male deer. Other types of scent material may be utilized with the result that various species and genders of wild animals may be attracted by varying the characteristics of the liquid scent material.

The use of the casing, breakable ampule, porous plug applicator swab, and dispensing cap enables the liquid scent material to be readily packaged in a sealed condition and easily transported to retail establishments, purchased by hunters and transported to a hunting location. For example, a deer hunter frequently places a deer stand in elevated positions on a tree or other support in areas frequented by deer during their travels between various locations. The deer hunter can position his deer stand in place, break the ampule and apply doe urine to various surfaces including the branches of shrubs, bushes, trees, tree trunks, onto his shoes or clothes to cover or mask any human scent and then occupy a concealed position on the deer stand. Thus, the deer hunter will not become contaminated with the doe urine and the doe urine will effectively entice or attract deer to the location of the hunter and cover or mask the human scent of the hunter thereby enabling more effective hunting procedures to be practiced.

Alternatively, the dispensing cap can be retained over the open end of the casing and porous plug applicator swab. Once the ampule is broken within the casing, the liquid scent material is absorbed by the swab and passes into the top of the dispensing cap, which then acts as a wick to dispense the liquid scent material to the ambient air.

While the casing and breakable ampule are disclosed as generally cylindrical in elongated design, it will be appreciated by those skilled in the art that other cross-sectional configurations beside circular can be utilized in the present invention, such as oval and rectangular. In addition, it may also be possible to design the casing and ampule in other than elongated structures so long as the ampule can be readily broken by compressing the flexible but shape-sustaining casing. The swab is retained in the open end of the casing and the dispensing cap is received over the open end of the casing and porous plug applicator swab.

The foregoing is considered as illustrative only of the principles of the invention. Further, since numerous other modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A dispenser and applicator for scent material comprising a hollow casing having a deformable peripheral wall, said casing including an open end and a closed end, a hollow frangible ampule having a quantity of liquid scent material encapsulated therein, said ampule being positioned within said casing, a dispensing cap removably mounted on and closing said open end of said casing, a porous plug applicator swab in said open end of said casing, said dispensing cap enclosing said swab, said ampule being rupturable within the casing by deforming said peripheral wall inwardly to discharge said scent material into said casing for passage into and through said swabs, said swab being a flexible porous material and extending outwardly of the open end of said casing and receiving liquid scent material from the ampule, when ruptured, to enable the liquid scent material to be directly applied to surface areas by contacting said swab with said surface areas when the dispensing cap is removed and to dispense the liquid scent material directly into the air as an odor from the cap when the cap is mounted on the open end of said casing.

2. The applicator as defined in claim 1, wherein said liquid scent material is the urine of a species of animal to attract other animals of the species to the surface areas on which the scent material was applied and to the area in which the liquid scent material was dispensed directly into the air.

3. The dispenser and applicator as defined in claim 1, wherein said liquid scent material in the ampule is a material to mask the scent of a human.

4. The dispenser and applicator as defined in claim 1, wherein said casing is constructed of shape-sustaining liquid proof plastic material having flexible characteristics to enable deformation of the peripheral wall when opposed squeezing forces are applied sufficient to deform the peripheral wall inwardly to rupture said ampule.

5. The dispenser and applicator as defined in claim 1, wherein said ampule is constructed of glass, said ampule having a cross-sectional area less than said casing for protecting said glass ampule from breakage until the peripheral wall of the casing is deformed inwardly by manual squeezing to rupture the ampule, said dispensing cap enclosing a substantial portion of the casing to protect the hand of a user when rupturing the glass ampule.

6. The dispenser and applicator as defined in claim 1, wherein said swab has small passageways therethrough to control the rate of discharge of scent material, said dispensing cap extending beyond the open end of said casing, and having an inturned terminal end in overlying contract with said swab for absorbing liquid scent material passing through said swab.

7. A method of dispensing a scent, comprising the steps of:

(a) providing a shape-sustaining flexible casing having an internal cavity and an open end disposed in communication with said internal cavity, a porous absorbent plug applicator swab closing the open end of the cavity, a frangible ampule disposed within said internal cavity having a predetermined amount of scented liquid disposed therein, and a dispensing cap of absorbent material selectively positioned at the open end of the casing for retaining the ampule in the casing and at the closed end of the casing in enclosed relation to a substantial portion of the casing for use as a handle;

(b) breaking said ampule within said casing by squeezing opposed areas of the casing inwardly to rupture the ampule to dispense said scented liquid;

(c) allowing said scented liquid to flow onto said swab and applying the scented liquid to surface areas by contacting said swab to the surface areas;

(d) allowing said scented liquid to flow through said swab into the dispensing cap to be dispensed directly into the air.

8. The method set forth in claim 7, wherein said step of providing said ampule having scented liquid therein includes the step of the scented liquid being deer urine for attracting male and female deer to the surface areas.

\* \* \* \* \*